US006466914B2

(12) United States Patent
Mitsuoka et al.

(10) Patent No.: US 6,466,914 B2
(45) Date of Patent: Oct. 15, 2002

(54) JOB BROKERING APPARATUS AND RECORDING MEDIUM

(75) Inventors: Madoka Mitsuoka; Youji Kohda, both of Kanagawa (JP)

(73) Assignee: Fujitsu Limited, Kawasaki (JP)

( * ) Notice: Subject to any disclaimer, the term of this patent is extended or adjusted under 35 U.S.C. 154(b) by 1 day.

(21) Appl. No.: 09/134,573

(22) Filed: Aug. 14, 1998

(65) Prior Publication Data

US 2002/0002476 A1 Jan. 3, 2002

(30) Foreign Application Priority Data

Mar. 11, 1998 (JP) .......................................... 10-059702

(51) Int. Cl.⁷ .............................................. G06F 17/60
(52) U.S. Cl. .............................................. 705/9; 705/37
(58) Field of Search .............................. 705/1, 26, 7, 8, 705/9, 37

(56) References Cited

U.S. PATENT DOCUMENTS

| | | | | |
|---|---|---|---|---|
| 5,117,353 A | * | 5/1992 | Stipanovich et al. | 705/11 |
| 5,164,897 A | * | 11/1992 | Clark et al. | 705/1 |
| 5,592,375 A | * | 1/1997 | Salmon et al. | 705/7 |
| 5,758,328 A | * | 5/1998 | Giovannoli | 705/26 |
| 5,765,138 A | * | 6/1998 | Aycock et al. | 705/7 |
| 5,794,207 A | * | 8/1998 | Walker et al. | 705/1 |
| 5,826,244 A | * | 10/1998 | Huberman | 705/37 |
| 5,848,403 A | * | 12/1998 | Gabriner et al. | 705/8 |
| 5,862,223 A | * | 1/1999 | Walker et al. | 705/1 |
| 5,884,270 A | * | 3/1999 | Walker et al. | 705/1 |
| 5,920,846 A | * | 7/1999 | Storch et al. | 705/7 |
| 5,923,552 A | * | 7/1999 | Brown et al. | 705/8 |
| 5,926,798 A | * | 7/1999 | Carter | 705/26 |
| 5,963,911 A | * | 10/1999 | Walker et al. | 705/7 |
| 5,978,768 A | * | 11/1999 | McGovern et al. | 705/1 |

FOREIGN PATENT DOCUMENTS

| | | |
|---|---|---|
| JP | 9-190469 | 7/1997 |
| JP | 9-282068 | 10/1997 |

OTHER PUBLICATIONS

Schiffman, Betsy, "Surfing for Home Improvement", Palo Alto Weekly, Nov. 28, 1997, p. 34.*
"ImproveNet: ImproveNet.com Now Matches Homeowners to Pre–Screened Architects and Designers; America's Home Iprovement Network Answers Consumer Demand for More Help with Home Remodeling", Business Wire, Dec. 4, 1997.*
"ImproveNet 2: ImproveNet Launches ContractorWatch: A Free, Nationwide Contractor Quality Tracking Network For Homeowners", Business Wire, Sep. 2, 1998.*
"ImproveNet: A match Made On The Internet: ImproveNet.com Helps Contractors Build Their Businesses", Business Wire, Oct. 15, 1997.*

* cited by examiner

Primary Examiner—Kyle J. Choi
(74) Attorney, Agent, or Firm—Staas & Halsey LLP

(57) ABSTRACT

A job brokering apparatus for brokering jobs in an open network environment, such as the internet, without complicated negotiations between a job provider and a contractor. A CGI program (broker program) started from a WWW server connected to a broker (300) in a network (500), such as the internet, receives registrations and applications for offered jobs from unspecified job-provider clients and unspecified contractor clients a process of a contractor selector portion (320), functionally realized by the broker program, refers to information about a job and to information about contractors to select a contractor, and notifies the job provider and the contractor using, for example, e-mail.

17 Claims, 32 Drawing Sheets

FIG. 3

Job Offer Application Form

Word Count       : 8,000 words

Due Date         : 98/03/16

Remuneration     : ¥100,000

[Place Offer]  [Cancel]

FIG. 4

| Job ID | Job-Provider ID | Job Provider's E-Mail Address | Word Count | Due Date | Remun. |
|---|---|---|---|---|---|
| Task001 | HachuA | hachua@chukai.or.jp | 8,000 | 98/03/16 | 100,000 |
| | | | | | |
| | | | | | |

FIG. 5

| Contracor ID | Contractor Name | Contractor's E-Mail Address |
|---|---|---|
| UkeoiA | Contractor A | ukeoia@chukai.or.jp |
| | | |
| | | |

FIG. 6

Job Contract Application Form

Word Count      :   8,000 words

Due Date        :  98/03/16

Remuneration    :   ¥100,000

Apply    Cancel

FIG. 7

| Job ID | Contractor ID | Application Due Date | Application Time |
|---|---|---|---|
| Task001 | UkeoiA | 96/03/06 | 13:30:00 |
|  |  |  |  |
|  |  |  |  |

FIG. 9

| Contracor ID | Date | Schedule Information |
|---|---|---|
| UkeoiA | 98/03/01 | Booked |
| UkeoiA | 98/03/02 | Unavailable |
| | | |

FIG. 12

| Contractor ID | Contractor Name | Contractor E-Mail Address | Aptitude Value |
|---|---|---|---|
| UkeoiA | Contractor A | ukeoia@chukai.or.jp | 5 |
| | | | |
| | | | |

FIG. 13

Job Evaluation Registration Form

Job ID          : Task001

Evaluation      : 5

[Register]  [Cancel]

FIG. 14

Job Offer Application Form

Word Count       : 8,000 words

Due Date         : 98/03/16

Remuneration     : ¥100,000

Desired Aptitude : 3

Place Offer    Cancel

FIG. 16

| Contractor ID | Contractor Name | Contractor E-Mail Address | Aptitude Value | Basic Fee | Basic Word Count | Maximum Word Count | Surcharge Rate |
|---|---|---|---|---|---|---|---|
| UkeoiA | Contractor A | ukeoia@chukai.or.jp | 5 | 12.5 | 2,000 | 3,000 | 1.5 |
| | | | | | | | |
| | | | | | | | |

FIG. 17

Contractor Condition Information Registration Form

Basic Fee : ¥12.5

Basic Word Count : 2,000 words

Maximum Word Count : 3,000 words

Surcharge Rate : 1.5

Register   Cancel

FIG. 18

Contractor Condition Information Registration Form

Lower Word Count Limit : 2501 words

Upper Word Count Limit : 3,000 words

Surcharge Rate : 1.5

[Register] [Cancel]

FIG. 19

| Job ID | Job-Provider ID | Job Provider's E-Mail Address | Word Count | Job Difficulty | Due Date | Maximum Remuneration | Desired Aptitude | Application Due Date |
|---|---|---|---|---|---|---|---|---|
| Task001 | HachuA | hachua@chukai.or.jp | 8,000 | 1.2 | 98/03/16 | 150,000 | 3 | 98/03/06 |
| | | | | | | | | |
| | | | | | | | | |

FIG. 20

| Job ID | Contractor ID | Job Application Date | Job Application Time | Number of Days Available | Expected Date of Job Completion |
|---|---|---|---|---|---|
| Task001 | UkeoiA | 96/03/06 | 13:30:00 | 5 | 96/03/12 |
| | | | | | |
| | | | | | |

FIG. 22

Job Offer Application Form

Word Count          : 8,000words
Difficulty          : 1.2
Due Date            : 98/03/16
Maximum Remuneration: ¥150,000
Desired Aptitude    : 3
Application Due Date : 98/03/06

| Place Offer | Cancel |

FIG. 23

| Candidate : | Pay | Apt. | Days |
|---|---|---|---|
| Contr. A : | 5,000 | 1 | 2 |
| Contr. B : | 3,000 | 2 | 2 |
| Contr. C : | 1,000 | 2 | 3 |
| Contr. D : | 0 | 0 | 0 |
| Weight : | 30 | 20 | 50 |

Set  Cancel

FIG. 24

| Candidate : | Suitability |
|---|---|
| Contr. A : | 2.7 |
| Contr. B : | 2.3 |
| Contr. C : | 2.2 |
| Contr. D : | 0 |

Place Offer    Cancel

FIG. 27

```
Job Offer Application Form

Word Count      :  8,000 words

Due Date        : 98/03/16

Remuneration    : ¥100,000

File Name       : work.txt

[ Place Offer ]  [ Cancel ]
```

FIG. 28

Intermediate Results of the Job Submission Form

File Name      : work.txt

Submit    Cancel

FIG. 29

Job Reoffer Form

File Name : work.txt

Job Progress : 80%

Reoffer   Cancel

FIG. 30

Divided-Job-Offer Application Form

Word Count : _____8,000 words

Due Date : 98/03/16

Remuneration : ¥100,000

Division : Chapter 1

| Div. End | Place Offer | Cancel |

FIG. 31

Job Contract Application Form (Divisional)

Chapter 1 : Decided

Chapter 2 : Contract Open

Chapter 3 : Contract Open

Chapter 4 : Decided

JOB BROKERING APPARATUS AND RECORDING MEDIUM

FIELD OF THE INVENTION

The present invention relates to a job brokering apparatus and a recording medium storing a program to realize the job brokering apparatus.

BACKGROUND OF THE INVENTION

In recent years, what is called SOHO (small office/home office) work environments are becoming widespread. Before ordering a job under a SOHO work environment, a job owner has to find a job contractor who is available for that job if the contractor has not been specified in advance.

Techniques for attaining this purpose in an open network environment such as the internet are developing and coming into practical use. For example, the following recruitment system is known. When a company wants to recruit personnel, it can register information about open position on the company server, and interested job applicants can submit information such as their personal data and qualifications. Using this method, a company can find suitable candidates for open positions, and applicants can find jobs to apply for. Such system can also realize a notification service via e-mail or on a web-site when personnel that is suitable for pre-registered jobs is registered, or when a job that suits their pre-registered wishes is registered.

Other techniques for efficiently retrieving suitable candidates for short-term jobs out of a plurality of contractors and offering a job to them are disclosed in Publications of Unexamined Japanese Patent Application No. Tokkai-Hei 9-190469 and No. Tokkai-Hei 9-282068. By using these techniques, a contractor who can carry out the offered job can be sought on the basis of pre-registered information such as schedule information of the pre-registered contractors or information about the contractor's ability to process a job. Thus, suitable applicants can be retrieved efficiently.

On conventional recruitment sites as described above, the job provider can look for the desired personnel, the applicant can look for the desired job, and when personnel or jobs are newly registered that comply with certain pre-registered conditions, a notification can be performed. However, there is the problem that it is not possible to negotiate on-site whether the job can actually be contracted or not. This means that the negotiation whether the job can actually be contracted or not has to be performed using e-mail or other communication means, and in some instances, the time used for such negotiation is longer than the time for the job itself. Moreover, the actual situation of job contracting is that the job provider can find a job contractor and negotiate a job contracting using the system as described above, but job contracting often fails because of the job contractor's current circumstances such as tight schedule, unexpected affairs or interruption of other jobs. In almost all cases, negotiations have to be repeated with a plurality of contractors, until finally a contractor can be found.

The technique disclosed in Publication of Unexamined Japanese Patent Application No. Tokkai-Hei 9-190469 has the function to offer jobs by acquiring schedule information of the contractor and selecting a contractor who seems to be able to carry out the task. However, in order to actually implement this function, a system for managing the schedules of regular contractors must be always activated and the schedule management on this system must be very precise. In environments using, for example, intra-company LANs, a precise schedule management may well be possible, but in an environment using an open network such as the internet, a perfectly precise schedule management in reality will be almost impossible when jobs are offered to outside professionals. Eventually, the job provider has to repeat individual negotiations with many contractors when offering jobs to outside professionals.

With the technique disclosed in Publication of Unexamined Japanese Patent Application No. Tokkai-Hei 9-282068, jobs can be offered appropriately according to the contractor's ability to process a job. However, the applicability of this technique is possibly limited to the case where the job provider is a specified company and the contractor is a specified affiliated company for which no negotiation is necessary, and that it is difficult to apply to the case where an unspecified job provider offers a job to an unspecified contractor.

Regarding the above-described problems, it is a purpose of the present invention to provide a job brokering apparatus and a recording medium storing a program to realize the job brokering apparatus, which can process brokering jobs in an open network client/server computer system environment such as the internet without a complicated negotiation between an unspecified job provider and an unspecified contractor.

SUMMARY OF THE INVENTION

To achieve these goals, a job brokering apparatus for brokering a job over a network by receiving a job offer request from a job-provider client used by a job provider, and receiving job applications for the offered job from contractor clients used by contractors, comprises a job offer notification portion for notifying the job offer to at least one contractor client used by contractor candidates who can become contractors for the job when the job offer notification portion receives a job offer request from the job-provider client; a contractor determination portion for determining the contractor who contracts the job from among the contractor candidates who applied for the job when a job application has been received corresponding to the notification from said job offer notification portion; and a contractor determination notification portion for notifying those contractor clients that were notified of the job offer by the job-provider client and said job offer notification portion, of the fact that a contractor has been determined by said contractor determination portion.

According to this structure, a job can be brokered without complicated negotiations between an unspecified job provider and an unspecified contractor. This means, the job-provider client can be used by an unspecified number of job providers and the contractor client can be used by an unspecified number of contractors. The job-provider client can offer jobs for arbitrary professions. The job offer notification portion notifies the job offer to the contractor clients used by contractor candidates who can become contractors for the job. Because the contractor candidates who receive this notification can determine whether to apply for the job or not, it is usually not necessary to control the complete schedule information of the contractors. Moreover, the contractor determination portion determines the contractor who actually contracts the job from among the contractor candidates who applied for the job. When a contractor has been determined, the contractor determination notification portion notifies the job provider and the contractor candidates of this fact, so that it becomes unnecessary to perform complicated negotiations between the job provider and the contractor.

It is preferable that said contractor determination portion determines one or more contractor candidates based on information about the conditions of the offered job and information about the contractors, and said job brokering apparatus further comprises a contractor candidate notification portion for notifying the job-provider client of said contractor candidates; and a job offer judgement receiving portion for receiving a judgement from the job-provider client whether to notify the job offer to one or more contractor candidates who the job-provider client has notified by said contractor candidate notification portion; wherein said job offer notification portion notifies the job offer to the contractor clients used by said one or more contractor candidates when said job offer judgement receiving portion has received a notification of the fact that a job has been awarded.

Referring to information about the conditions for the offered job and information about the contractor, suitable contractor candidates to who the job should actually be awarded can be determined. Furthermore, it can be verified to what kind of contractor a job offer notification is sent when a job offer is actually performed.

It is preferable that said information about the conditions of the offered job comprises information about workload, due date and remuneration, and said information about the contractor comprises information about the contractor's ability to process a job and a desired remuneration.

The contractor candidates can be determined on the basis of whether the contractors can finish the job until the job's due date and whether an agreement is likely to be reached concerning the remuneration.

It is preferable that said information about the contractor's ability to process a job is determined on the basis of information that at least one of the contractor client and the job-provider client notify said job brokering apparatus of when the contractor has finished a job.

Thus, objective information about the ability to process a job can be obtained.

It is preferable that said job brokering apparatus further comprises a job completion notification receiving portion for receiving a notification from the contractor client that a job has been finished, wherein said information about the contractor's aptitude to process a job is determined on the basis of the number of notifications that said job completion notification receiving portion has received.

Thus, the information about the ability to process a job is based on an objective evaluation of the number of times that the contractor has finished a job, and not on a self-assessment by the contractor.

It is preferable that said job brokering apparatus further comprising a job evaluation receiving portion for receiving from the job-provider client an evaluation of the job that the contractor has finished, wherein said information about the contractor's aptitude to process a job is determined on the basis of the evaluation that said job evaluation receiving portion has received.

Thus, the information about the ability to process a job is based on the job provider's objective evaluation of the finished jobs he has received.

It is preferable that said contractor determination portion determines the suitability of each of the determined one or more contractor candidates for the offered job, and said contractor candidate notification portion notifies the job-provider client of said contractor candidates and the suitability of each contractor candidate.

Thus, information can be provided that can serve as reference when the job provider decides whether to actually award a job.

It is preferable that, when said job offer judgement receiving portion has received a notification of the fact that a job has not been awarded, said job offer judgement receiving portion further receives information about the conditions of the job that is sent again from the job-provider client, said contractor determination portion again determines one or more contractor candidates on the basis of information about the job received by said job offer judgement receiving portion, and said contractor candidate notification portion notifies the job-provider client of the contractor candidate determined by said contractor determination portion.

Thus, the set conditions can be done over according to the number and the suitability etc. of the determined contractor candidates.

It is preferable that said job brokering apparatus further comprises an electronic information receiving portion for receiving information that is necessary to perform the job as electronic information from the job-provider client; an electronic information storage portion for storing electronic information received by said electronic information receiving portion; and an electronic information transmission portion for transmitting electronic information stored in said electronic information storage portion to the contractor client used by the contractor who has been determined by the contractor determination portion.

Thus, not only the job brokering itself, but also the transmission of documents etc. that are necessary for the contractor who actually contracts the job to perform the job can be automated.

It is preferable that said electronic information receiving portion receives from the contractor client electronic information that indicates a job result when the contractor has finished the job; and said electronic information transmission portion transmits electronic information received from the contractor client to the job-provider client used by the job provider who awarded the job.

Thus, when the contractor has finished the job, the transmission of the result to the job provider can be further automated. Therefore, the job provider only has to perform the job offer to receive the finished job.

A computer-readable recording medium according to the present invention stores a program for realizing a job brokering apparatus which brokers the job over a network by receiving a job offer request from a job-provider client used by a job provider, and receiving job applications for the offered job from contractor clients used by contractors. The program comprising processes for realizing a job offer request receiving step, where a job offer request is received from the job-provider client; a job offer notification step, where the contractor clients used by contractor candidates who can become contractors for the job when receiving a job offer request in said job offer request receiving step; a job application receiving step, where a job application corresponding to the notification in said job offer notification step is received; a contractor determination step, where the contractor who contracts the job is determined from among the contractor candidates who applied for the job when a job application has been received in said job application receiving step; and a contractor determination notification step, where those contractor clients who were notified of the job offer by the job-provider client and in said job offer notification step, are notified of the fact that a contractor has been determined when a contractor has been determined in said contractor determination step.

Such a program can be used to perform a job brokering using the job brokering apparatus according to the present invention in an environment such as the internet.

BRIEF DESCRIPTION OF THE DRAWINGS

FIG. 3 is a schematic drawing of an example of a screen displayed by the job-provider client in a first embodiment.

FIG. 4 is a diagram illustrating an example of the contents of the job information database in the first embodiment.

FIG. 5 is a diagram illustrating an example of the contents of the contractor information database in the first embodiment.

FIG. 6 is a schematic drawing of an example of a screen displayed by the contractor client in the first embodiment.

FIG. 7 is a diagram illustrating an example of the contents of the job brokering database in the first embodiment.

FIG. 9 is a diagram illustrating an example of the contents of the schedule information database in a second embodiment.

FIG. 12 is a diagram illustrating an example of the contents of the contractor information database in a third embodiment.

FIG. 13 is a schematic drawing of an example of a screen displayed by the job-provider client in the third embodiment.

FIG. 14 is a schematic drawing of an example of a screen displayed by the job-provider client in the third embodiment.

FIG. 16 is a diagram illustrating an example of the contents of the contractor information database in a fourth embodiment.

FIG. 17 is a schematic drawing of an example of a screen displayed by the contractor client in the fourth embodiment.

FIG. 18 is a schematic drawing of an example of a screen displayed by the contractor client in the fourth embodiment.

FIG. 19 is a diagram illustrating an example of the contents of the job information database in the fourth embodiment.

FIG. 20 is a diagram illustrating an example of the contents of the job brokering database in the fourth embodiment.

FIG. 22 is a schematic drawing of an example of a screen displayed by the job-provider client in the fourth embodiment.

FIG. 23 is a schematic drawing of an example of a screen displayed by the job-provider client in the fourth embodiment.

FIG. 24 is a schematic drawing of an example of a screen displayed by the job-provider client in the fourth embodiment.

FIG. 27 is a schematic drawing of an example of a screen displayed by the job-provider client in the fifth embodiment.

FIG. 28 is a schematic drawing of an example of a screen displayed by the contractor client in a sixth embodiment.

FIG. 29 is a schematic drawing of an example of a screen displayed by the contractor client in a seventh embodiment.

FIG. 30 is a schematic drawing of an example of a screen displayed by the job-provider client in a sixth embodiment.

FIG. 31 is a schematic drawing of an example of a screen displayed by the job-provider client in a sixth embodiment.

DESCRIPTION OF THE PREFERRED EMBODIMENTS

The invention will be better understood from the following detailed description when considered with reference to the accompanying drawings.

Figure 1:
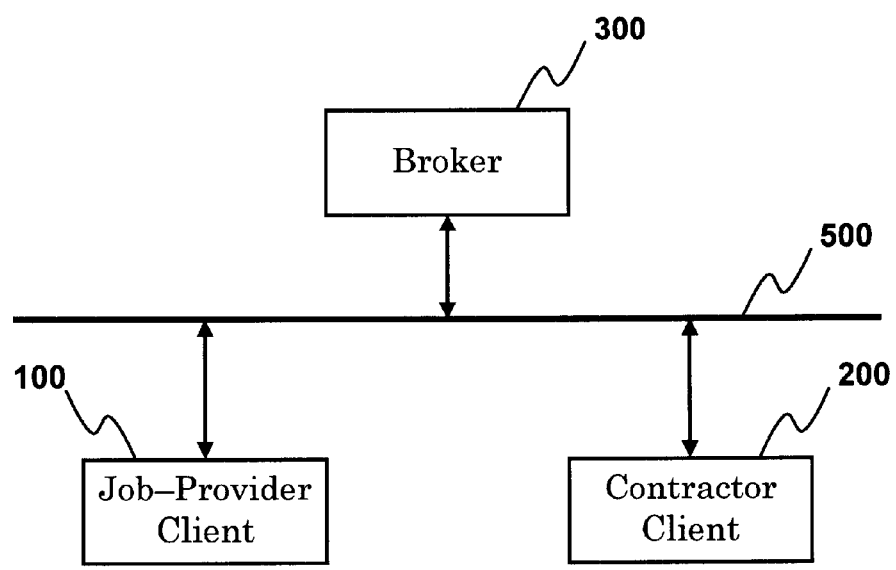
FIG. 1 is a drawing that illustrates the environment in which the job brokering apparatus of the present invention is realized.

FIG. 1 illustrates an environment for realizing the job brokering apparatus according to the present invention. The job brokering apparatus in FIG. 1 is realized in an environment comprising a job-provider client 100, a contractor client 200, and a broker 300.

The job-provider client 100 is used, for example, by a number of companies that are job providers, and is used for registering jobs at the broker 300 that the job providers want to offer. The contractor client 200 is used, for example, by a number of professionals that serve as contractors, and is used for registering, for example, job contracting conditions at the broker 300. Accordingly, only one job-provider client 100 and one contractor client 200 are illustrated in FIG. 1, but actually, a plurality of job-provider clients and a plurality of contractor clients can be organized.

The broker 300 performs the brokering of jobs based on the information that has been registered by the job-provider client 100 and the contractor client 200. The process steps of the broker 300 will be described later, specifically, a WWW-server (WWW="world wide web") can be used for the broker 300, and the function of the broker 300 can be realized by a CGI ("computer graphics interface") program (referred to as "broker program" below) executed on this WWW-server.

The job-provider client 100, the contractor client 200, and the broker 300 are all connected to a network 500, such as the internet, and bi-directional communication can take place between the job-provider client 100 and the broker 300, or between the broker 300 and the contractor client 200. Specifically, the job-provider client 100 and the contractor client 200 use a WWW-browser, and they comprise a communication portion for using a communication protocol, such as HTTP (Hypertext Transfer Protocol), between themselves and the broker 300, so that the bi-directional communication can be realized.

The job-provider client 100 and the contractor client 200 can be notified for example of the result of the job brokering in the broker 300 using a notification portion, such as e-mail.

The communication portion and the notification portion of the present example are not limited to HTTP and e-mail.

Here, the "communication portion" operates the communication performed while exchanging requests and replies to these requests, and the "notification portion" performs the notification when the recipient client is not operating at the time of transmission, then the notification message will be saved on the network, so that the recipient can receive the notification message asynchronously, when connecting to the network later. There are many ways to realize such communication portions and such notification portions.

Figure 2:
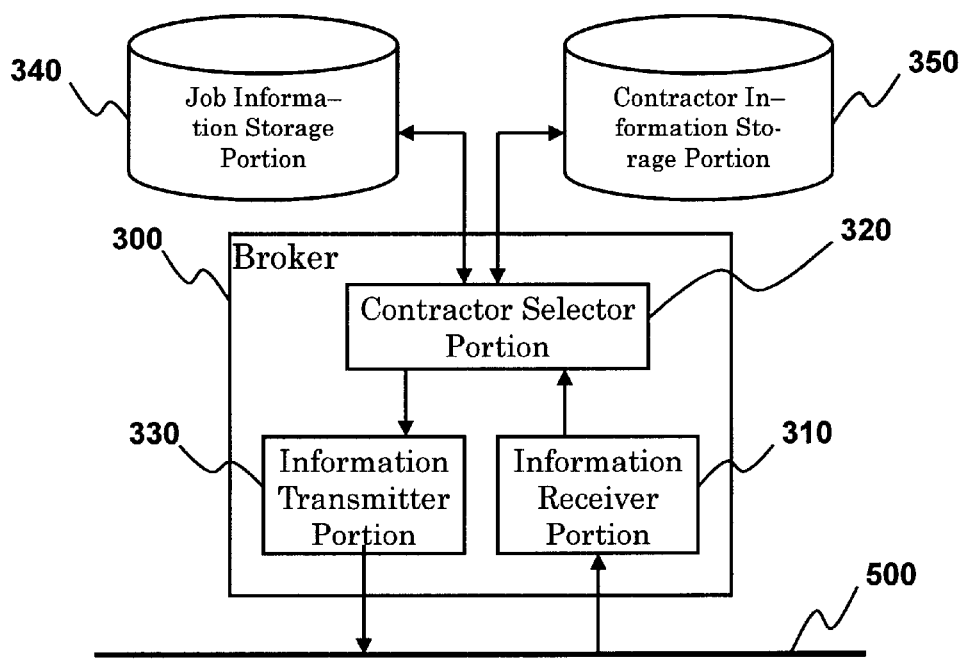
FIG. 2 is a functional block diagram illustrating the structure of the broker in the job brokering apparatus of the present invention.

FIG. 2 is a functional block diagram illustrating the structure of the broker 300 in the job brokering apparatus according to the present invention. As shown in FIG. 2, the broker 300 of the present invention comprises functionally an information receiver portion 310, a contractor selector portion 320, an information transmitter portion 330, a job information storage portion 340, and a contractor information storage portion 350.

The information receiver portion 310 receives job registrations from the job-provider client 100, and registrations of contracting conditions etc from the contractor client 200, or other information, according to necessity. It is a part for receiving information from the above-mentioned communication portion and the notification portion, and corresponds to the job completion notification receiving portion, the job evaluation receiving portion, the job offer judgement receiving portion, and the electronic information receiving portion cited in the claims.

The contractor selector portion 320 stores various kinds of information that the information receiver portion 310 receives in a job information database located in the job information storage portion 340 and a contractor information database located in a contractor information storage portion 350. The contractor selector portion 320 uses this information to select a contractor. It corresponds to the contractor determination portion cited in the claims.

The information transmitter portion 330 notifies the selection results of the contractor selector portion 320 to the job-provider client 100 and the contractor client 200 by e-mail, and transmits information whenever necessary. It is a part to transmit information from the above-mentioned communication portion and the notification portion, and corresponds to the job offer notification portion, the contractor determination notification portion, the contractor candidate notification portion and the electronic information transmission portion cited in the claims.

The job information storage portion 340 stores a job information database and a job brokering database, whose contents is adapted to the respective embodiments.

The contractor information storage portion 350 stores a contractor information database, whose contents is adapted to the respective embodiments.

The following is a description of various embodiments of a job brokering apparatus according to the present invention realized in such an environment. As a profession, the brokering of translation jobs is taken as an example.

First Embodiment

The following is a description of a first embodiment of the present invention. In this embodiment, offering and accepting jobs is possible without complicated negotiations between the job provider and the contractor. This is the most basic embodiment of the present invention.

FIG. 3 shows a schematic drawing of an example of a screen displayed by output portion, such as a display device, provided by the job-provider client 100, when the job-provider client 100 requests the broker 300 with the brokering of a translation job in this embodiment. To be specific, this screen is displayed when the job-provider client 100 accesses the ordering page on the site of the broker 300 (called "broker site" below).

As can be seen from this drawing, in this embodiment, the job provider has to specify the number of words (called "word count" below) of the translation, due date, and remuneration via the job provider clients 100 first, before requesting a job brokering. Such information relevant to the offered job is called "job information" below. To be specific, after the necessary information has been entered, the above information is sent to the broker 300 by, for example, clicking the button labeled "place offer" in FIG. 3 with an input portion such as a mouse. The job information that is actually sent out comprises a job-provider identificator (called "job-provider ID" below) and the e-mail address of the job provider in addition to the above information. The identificator that the job provider specifies when logging into the job-provider client 100 can be used as the job-provider ID, for example. Moreover, the e-mail address does not have to be included in the information sent. Instead, for example, the broker 300 can store the relationship between job-provider ID and e-mail address.

The broker program starts when job information is sent to the broker 300. The broker program in this embodiment assigns a job indicator (called "job ID" below) to the job information sent with the contractor selector portion 320, and stores the job information in the job information database.

FIG. 4 illustrates an example of the contents of the job information database in this embodiment. As can be seen in this figure, the job information database of this embodiment stores job ID, job-provider ID, job provider e-mail address, word count, due date and remuneration In this embodiment, the offered job is a translation job. Therefore, the "word count" is used as the measure for the work load. However, for other professions, other measures are possible. Moreover, even in the case of translations, the present invention is not limited to word count, and other measures of the work load such as character count, page count, etc. are possible. Furthermore, "due date" means date of job delivery, and "remuneration" means the amount of money that is paid for the job, and both conditions are specified and entered by the job provider as job conditions.

When job information is stored in the job information database, the information transmitter portion 330 notifies the contractor clients 200 who are registered in the contractor database of the fact that a job has been offered. This notification can be performed, for example, using a notification portion, such as e-mail. Such a notification of the fact that a job has been offered is called "job offer notification" below.

FIG. 5 shows an example of the contents of a contractor database according to this embodiment. As is shown in this figure, the contractor database according to this embodiment stores an identificator indicating the contractor (called "contractor ID" below), the contractor's name, and the contractor's e-mail address. The contractor's name does not have to be stored necessarily. By referring to the stored contractor's e-mail address, job offer notifications can be sent out, for example by e-mail, to the registered contractors.

When the contractor client 200 has received a job offer notification, the contractor can access the broker site with the contractor client 200 to check an offered job description on-screen and decide whether to apply for the job or not.

FIG. 6 shows a schematic drawing of an example of a screen displayed by the contractor client 200 when a job has been offered. The screen in FIG. 6 is almost the same as the screen in FIG. 3. However, it is not possible to enter information, and the buttons on the lower right of the screen is marked "Apply".

The contractor can apply for a job by pushing the button "Apply" on the screen shown in FIG. 6. When the button "Apply" is pushed, a notification that the contractor applies for the job is sent to the broker 300. When the broker 300 in this embodiment has received a notification that a job is applied for, the broker 300 stores the notification as relevant information in a job brokering database.

FIG. 7 illustrates an example of the contents of the job brokering database in this embodiment. The job brokering database in this embodiment is stored in the job information storage portion 340. However the physical storage location is not limited thereto. As is shown in the same figure, the job brokering database stores the relationship between the job IDs of offered jobs and the contractor IDs of the contractors who have applied for these jobs. Moreover, the job brokering database stores the information hat is necessary for a method of selecting a contractor. For example, since he method of selecting a contractor in this embodiment is to award the offered job to the contractor who was the fastest to apply for this job, date and time of the application are stored in the job brokering database.

When offered jobs are just awarded to the contractor who is the fastest to apply, it may not be necessary to go so far as to store date and time. Instead, it may be sufficient to store whether the contractor for this job has been decided or not.

When a contractor has been selected by the contractor selector portion 320, the information transmitter portion 330 notifies the selected contractor, the other contractors and the job provider about the selection. A notification portion such as e-mail can be used for the notification. Such a notification of the fact that a contractor has been decided is called "contractor determination notification" below. With this notification, the other contractors can be informed that they have not been selected as contractors, and the job provider can be informed that a contractor has been determined.

Figure 8:
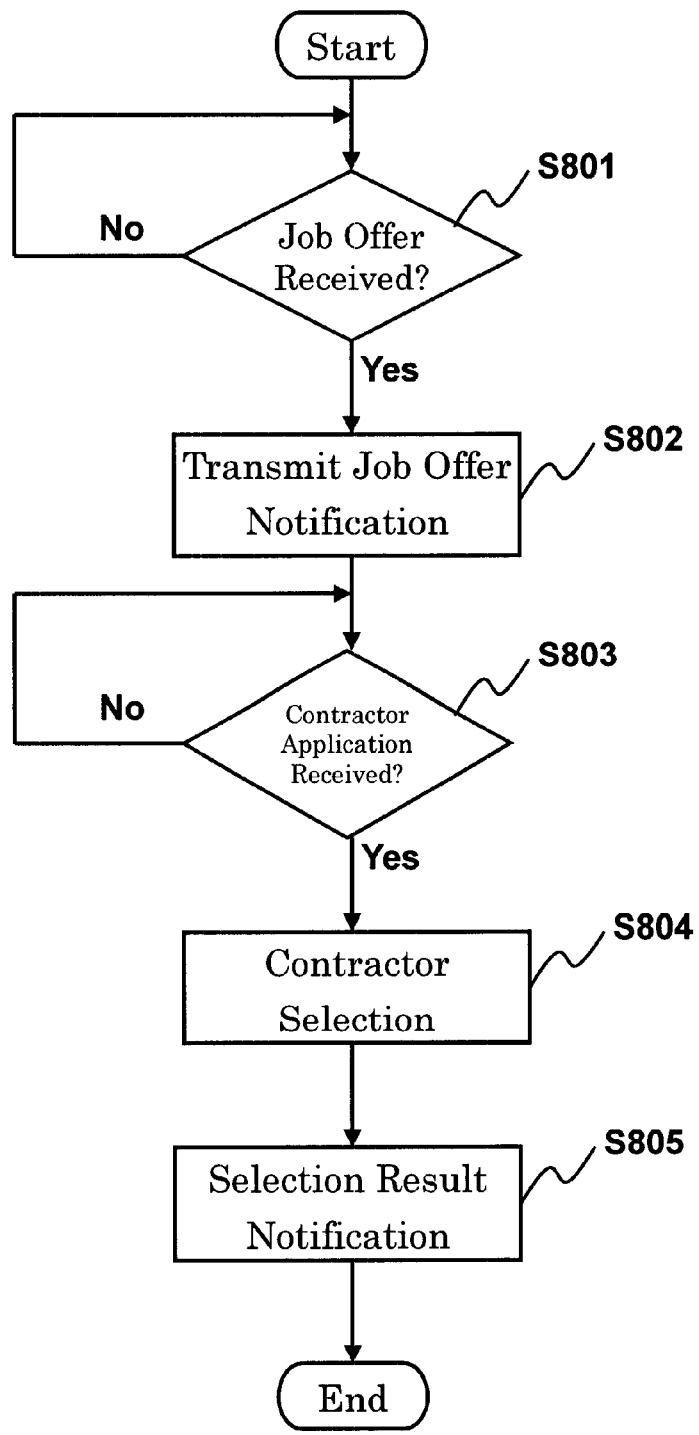
FIG. 8 is a flowchart of the process steps of the broker program in the first embodiment.

The following is an explanation of the process steps of a broker program for performing the above-described process. FIG. 8 is a flowchart showing the process steps of the broker program according to this embodiment. As described above, the job brokering apparatus according to the present invention can be realized by starting the broker program on a WWW server set up as the broker 300.

As is illustrated in FIG. 8, when the broker program according to this embodiment receives a job offer (S801: Yes), the job offer is notified to all contractors registered in the contractor database (S802), Moreover, when the broker program receives a job application from a contractor (S803: Yes), and a contractor has been selected (S804), the contractor and the job provider are notified of the selection result (S805).

When the contractor who was the fastest to reply is selected as the contractor, as has been described above, then the selection result notification can be performed in due course. This means, a notification can be sent to the contractor who was the first to apply for the job in question. This notification can be sent out directly after the application, notifying the contractor that he has been selected. After this, when other contractors apply for the same job, they can be notified in due course that they have not been selected.

Using a job brokering apparatus according to this embodiment as explained above, a contractor for a job can be selected without complicated negotiations with the contractor.

Second Embodiment

The following is an explanation of a second embodiment of the present invention. In the first embodiment, a job offer is forwarded to all contractors that are already registered as contractors in the contractor database. In this embodiment on the other hand, a method is explained where, based on the schedules of the contractors, a job offer notification is only forwarded to contractors who can actually contract the job.

FIG. 9 illustrates an example of the contents of a schedule information database in this embodiment, which is stored in the contractor information storage portion 350. As can be seen in this figure, the contractor database of this embodiment stores also information about the schedules of the contractors (called "schedule information" below). Each contractor enters his schedule information from the contractor client 200.

Figure 10:
FIG. 10 is a schematic drawing of an example of a screen displayed by the contractor client in the second embodiment.

FIG. 10 shows a schematic drawing of an example of the screen displayed by the contractor client 200 when the contractor enters his schedule information. As can be seen in this figure, the schedule information in this embodiment for each date can be entered according to the circumstances as "Available", "Unavailable", or "Booked", but other categories of schedule information are of course possible as well.

Figure 11:
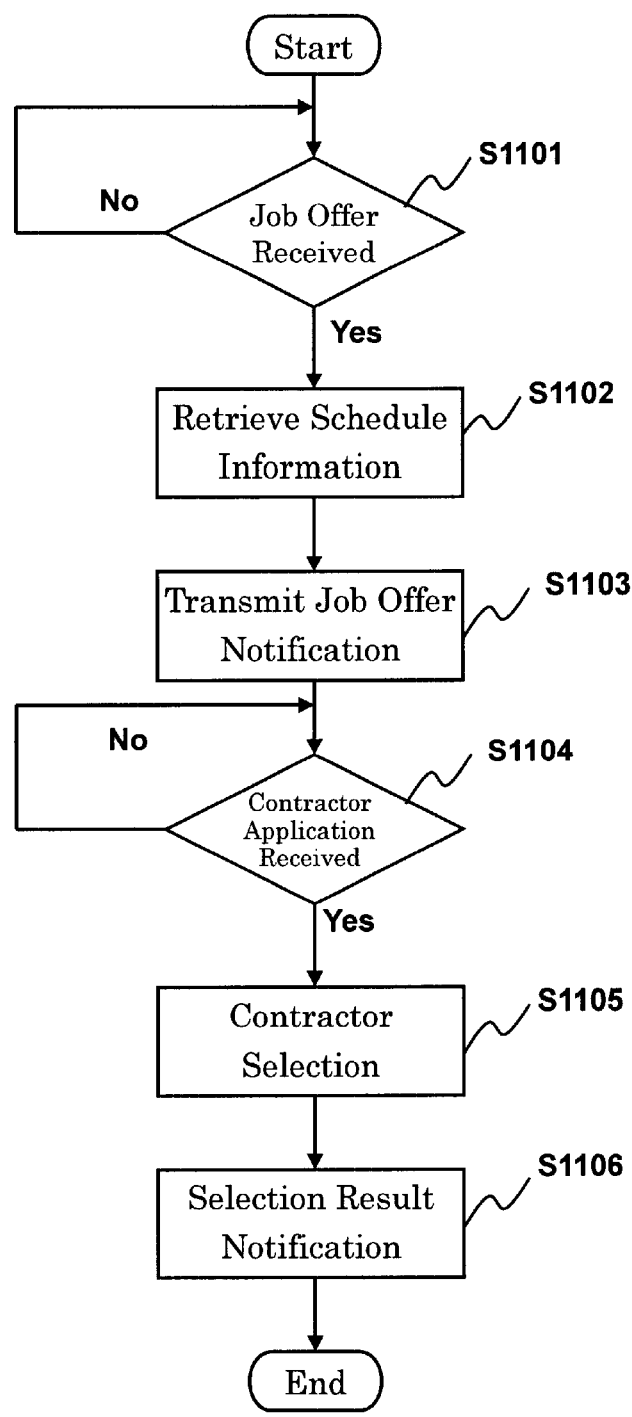
FIG. 11 is a flowchart of the process steps of the broker program in the second embodiment.

FIG. 11 is a flowchart showing the process steps of the broker program according to this embodiment. As shown in this figure, when the broker program of this embodiment receives a job offer (S1101: Yes), it retrieves schedule information (S1102), and transmits a job offer notification only to those contractors whose schedule is free (S1103). When a job is offered in this embodiment, the estimated turnaround time for the job is entered in addition to the due date. Consequently, the broker program of this embodiment can decide which contractors to send a job offer notification to by referring to the schedule information and the estimated turnaround time.

Then, when the program has received the job application from a contractor (S1104: Yes), it selects the contractor (S1105), and notifies the contractor and the job provider of the selection result (S1106), which is similar to the first embodiment.

By performing the above-described process, the job brokering apparatus of this embodiment can avoid the transmission of job offer notifications to contractors when it is clear from their schedule that they cannot be contracted for the job, so that the transmission amount can be reduced. It is not necessary that the contractor has his schedule precisely registered at all times, and he can decide whether to apply for a job or not after receiving a job offer notification.

Third Embodiment

The following is an explanation of a third embodiment according to the present invention. This embodiment relates to a method for accumulating in a database aptitude values of the respective contractors based on the results of jobs that they have contracted before. By accumulating these aptitude values, job brokering can be performed even more appropriately, on the basis of the contractor's aptitude value.

FIG. 12 illustrates an example of the contents of a contractor information database according to this embodiment. As can be seen in this figure, the contractor database of this embodiment stores also an aptitude value for each contractor, in addition to the information described in the first embodiment.

As for the aptitude value, it is possible to accumulate automatically, as a so-called experience value, the number of times a job has been contracted, or, if the contractor notifies the broker 300 with the contractor client 200 of the fact that a job has been finished, it is possible to accumulate automatically the number of times a job has been finished. It is also possible that the job provider records an evaluation of the contractor's work. Concerning the job provider's evaluation, it is possible to keep adding the evaluation numbers and store them accumulatively, or to store an average value of the evaluations.

FIG. 13 shows a schematic drawing of an example of a screen that is displayed when the job provider enters an evaluation of a contractor's job in this embodiment. In this embodiment, pushing the "Register" button on the screen illustrated in FIG. 13 starts a broker program, which registers the aptitude value and stores the average of the evaluation values that the job provider has entered until then. This average is stored in the constructor database. However, as explained above, other methods are possible for the process steps of the broker program when registering the aptitude values.

FIG. 14 shows a schematic drawing of an example of a screen that is displayed by the job-provider client 100 when the job provider offers a job in this embodiment. Assigning a desired contractor aptitude value with the screen illustrated in FIG. 14, it is possible for the job provider to send out a job offer notification only to contractors who have at least the aptitude value necessary for the job.

Figure 15:
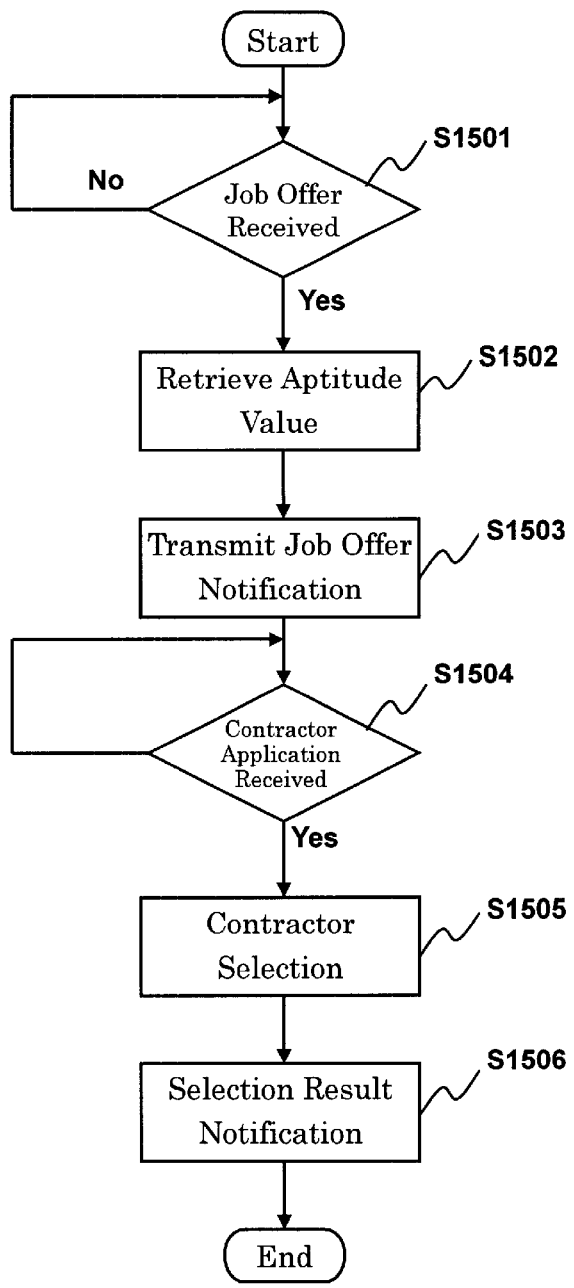
FIG. 15 is a flowchart of the process steps of the broker program in the third embodiment.

FIG. 15 is a flowchart showing the process steps of the broker program according to this embodiment. As shown in this figure, when the broker program of this embodiment receives a job offer (S1501: Yes), it refers to the aptitude values of the contractors stored in the contractor database to retrieve suitable contractors (S1502), and transmits a job offer notification only to the contractors who satisfy the desired aptitude value (S1503).

After this, when the program receives a job application from a contractor (S1504: Yes), it selects a contractor (S1505). Then, the program notifies this selection result to the contractor and the job provider (S1506), as in the first embodiment.

By performing the above-described process, it is possible for the job brokering apparatus of this embodiment to send a job offer only to contractors who have the aptitude required by the job provider. Since the aptitude value in this embodiment is a value that is automatically accumulated by the job brokering apparatus, or relies on the job provider's objective evaluation, false statements from the contractor can be avoided.

Fourth Embodiment

The following is an explanation of a fourth embodiment of the present invention. In the first three embodiments, a job offer notification was transmitted on the basis of the contractors' schedules or aptitude values. In this embodiment, however, conditions such as the importance and difficulty of the job offered by the job provider, the contractors' aptitude, experience and desired remuneration are considered, so that an even more appropriate job brokering is possible.

FIG. 16 illustrates an example of the contents of a contractor database according to this embodiment. As can be seen in this figure, the contractor database of this embodiment stores basic fee, basic word count, maximum word count, and surcharge rate for each contractor, in addition to the information described in the third embodiment.

Here, "basic fee" means the remuneration per word for the translation of a text with the job difficulty "1" (=normal difficulty). In this embodiment, the remuneration is per word, but the present invention is not limited to this calculation method. The example in this embodiment is for the profession of translation, so that the fees explained are translation fees. However, this embodiment can easily be adapted to other professions by storing general basic fees.

"Basic word count" means the average word count that can be translated in one day in the case of a text with of difficulty "1". When this embodiment is adapted to other professions, this value should correspond to a basic workload of the profession.

"Maximum word count" means the maximum word count that can be translated in one day in the case of a text with the difficulty "1". When this embodiment is adapted to other professions, this value may correspond to a maximum workload of the profession.

"Surcharge rate" is the surcharge rate per word, when the workload per day exceeds the basic word count. To be specific, when the word count that has to be translated per day, which can be calculated from the word count of the offered job and the due date, exceeds the basic word count, then the "surcharge rate" corresponds to the fee for the portion in excess of the basic word count. As is shown in the example in FIG. 16, when, for example, the word count for an offered job is 15000 words and the work has to be completed in five days, a translation load of 3000 words per day is necessary. Because this word count exceeds the basic word count (2000 words), the remuneration for the 1000 words in excess of the basic word count is multiplied with the surcharge rate (1.5), so that the fee per word is ¥18.75. Fractions can be dealt with in a suitable manner.

In the example of FIG. 16, the rate for the word count in excess of the basic word count is flatly multiplied by 1.5. However, a multi-tier surcharge rate can be set for the word count in excess of the basic word count. For example, the surcharge rate for the portion of 2000 to 2500 words can be set to 1.5, the surcharge rate for the portion of 2501 to 3000 words to 2.0, etc. In any case, each contractor sets the surcharge rates when registering as a contractor. The contractors can change these entries after registration.

FIG. 17 shows a schematic drawing of an example of the screen displayed by the contractor client 200 in this embodiment when a contractor registers as a contractor or corrects the registered information. As can be seen in this figure, the information entered on this screen is stored in the contractor information database. The design of this screen depends on the information to be entered. That means, for example, a multi-tier setting for the surcharge rate can be accomplished by registering surcharge rates for different word count ranges as illustrated by the screen in FIG. 18.

The following explains a method for offering a job according to this embodiment.

FIG. 19 illustrates an example of the contents of a job information database according to this embodiment. As can be seen in this figure, the job information database of this embodiment stores job ID, job-provider ID, job providers' e-mail address, word count, and due date, in addition to job difficulty, maximum remuneration, desired aptitude and application due date.

Here, "job difficulty" means the ratio of the time that it takes to translate the offered text to the time that it takes to translate a normal text of the same length. The job provider enters this value after judging the difficulty of the job. For example, when the job provider decides that a certain job takes 1.5 times longer than a job with the job difficulty "1", then a job difficulty of "1.5" is assigned to this job.

"Maximum remuneration" means the maximum remuneration that the job provider is willing to pay This value is entered individually when the job provider offers a job.

"Desired aptitude" is the minimum aptitude value that the job provider desires for a certain job. This value corresponds to the aptitude value stored in the contractor database.

The "application due date" is a date that is set for each job, and is the due date for a job application. When this date has passed, the broker 300 selects a contractor.

FIG. 20 shows an example of the contents of a job brokering database according to this embodiment. According to this figure, the job brokering database of this embodiment stores the number of days available and the expected day of job completion, in addition to the contents described in the first embodiment.

The "Number of Days Available" means the number of days that a contractor is actually available until the deadline of the job. Here, the broker program automatically calculates the number of days that a contractor is actually available with reference, for example, to the schedule information described for the second embodiment.

The "expected day of job completion" indicates the expected date for the completion of a job. To be specific, the date for the completion of a job is calculated on the basis of the schedule information on the condition that the translation is performed at the pace of the basic word count, then stored automatically. When the due date cannot be met at the pace of the basic word count, a date is stored on the basis of a value equivalent to the number of days available.

Figure 21:
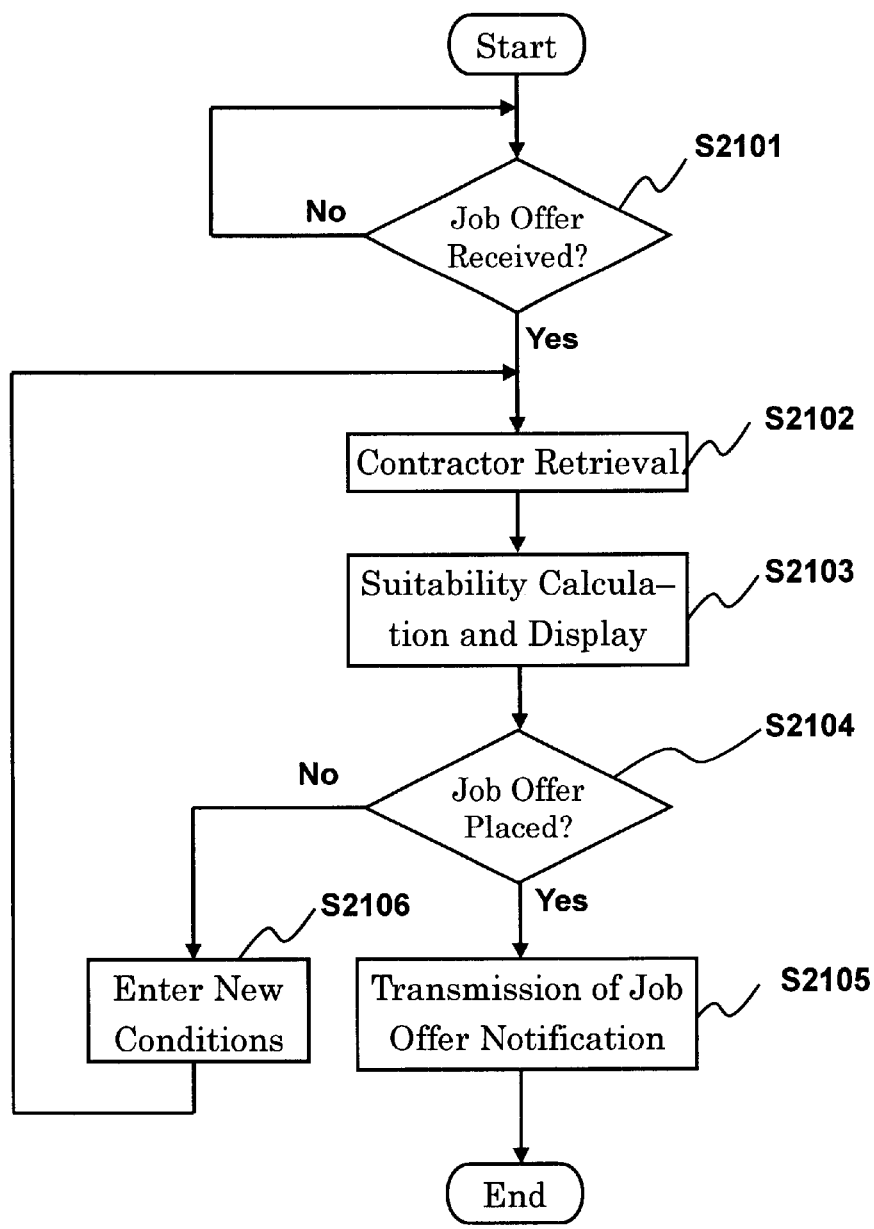
FIG. 21 is a flowchart of the process steps of the broker program in the fourth embodiment.

FIG. 21 is a flowchart showing the process steps of the broker program when a job is offered in this embodiment. As shown in this figure, when the broker program of this embodiment receives a job offer (S2101: Yes), it refers to the aptitude values and the desired conditions of the contractors stored in the contractor database to retrieve the contractors fulfilling those conditions (S2102).

The following is an explanation of the conditions for the contractor retrieval according to this embodiment. FIG. 22 shows a schematic drawing of an example of the screen displayed by the job-provider client 100 in this embodiment. As can be seen in this figure, in this embodiment, the job provider enters the information to be stored in the above-described job information database into the job-provider client 100, and based on this information, first of all, retrieves the contractors satisfying these basic conditions.

To be specific, the above-mentioned "basic conditions" of this embodiment are the following three conditions: The first condition concerns the remuneration. The requested remuneration specified by the contractor calculated on the basis of the word count, the job difficulty in addition to the basic fee and the surcharge rate specified by the contractor has to be lower than the maximum remuneration specified by the job provider. To be specific, this first condition can be described by (Maximum Remuneration)>(Word Count)×(Job Difficulty)×(Basic Fee)×(Surcharge Rate). Equation. 1:

The second condition is that the job can be completed until the due date considering the difficulty of the job and the contractor's ability to process a job. To be specific, this second condition can be described by (Word Count)×(Job Difficulty)<(Maximum Word Count)×(Number of Days Available) Equation. 2:

The third condition is that the contractor's aptitude value is higher than the aptitude value desired by the job provider. To be specific, this third condition can be described by (Desired Aptitude Value)<(Aptitude Value) Equation. 3:

The broker program calculates suitability values based on the fee, aptitude, and schedule for the contractors who fulfill the above three conditions, and transmits these suitability values to the job-provider client 100. The following is an explanation of the details of the suitabilities.

The "fee suitability" indicates the difference between the maximum remuneration proposed by the job provider and the remuneration that is calculated according to the conditions set by the contractor. To be specific, it can be calculated according to (Fee Suitability)=(Maximum Remuneration)−(Word Count)×(Job Difficulty)×(Basic Fee)×(Surcharge Rate) Equation. 4

The "aptitude suitability" is a value indicating the difference between the aptitude value desired by the job provider and the contractor's aptitude value. To be specific, it can be calculated according to (Aptitude Suitability)=(Aptitude Value)−(Desired Aptitude Value) Equation. 5:

The "schedule suitability" is a value indicating the difference between the due date desired by the job provider and the contractor's expected date of job completion. To be specific, it can be calculated according to (Schedule Suitability)=(Due Date)−(Expected Date of Job Completion) Equation. 6:

When the above suitabilities are displayed as shown in FIG. 23, the job provider adjusts weighting values for these suitabilities. Weighting values for the suitabilities are values indicating which of the above three suitabilities is the most important factor. To be specific, for a job that has to be finished quickly even if the fee is a bit high, the weighting value for schedule suitability should be raised. On the other hand, when there is a lot of time for a given job but the budget for this job is tight, then it is possible to raise the weighting value for fee suitability.

When the adjustment of the weighting value is finished, the broker program calculates a total suitability, and transmits it to the job-provider client 100 (S2103). To be specific, the total suitability is calculated according to (Total Suitability)=(Fee Suitability)×(1/1000)×(Fee Weighting Value)+(Aptitude Suitability)×(Aptitude Weighting Value)+(Schedule Suitability)×(Schedule Weighting Value) Equation 7:

FIG. 24 shows a schematic drawing of an example of the screen displayed by the job-provider client 100, displaying the suitabilities. Referring to the screen illustrated in this drawing, the job provider can decide whether to offer the job under these conditions or not. If the job offer is placed (S2104: Yes) job offer notifications are transmitted with a notification portion, such as e-mail, after specifying the application due date (S2105).

In case that the variation between the values of suitabilities of the contractor candidates is small, it can be expected that the conditions will be almost the same, regardless which contractor the job is awarded to. Therefore, it is a good strategy to set the application entry due date to an early date, when selecting a contractor, simply offer the job to the contractor who applied first. On the other hand, when there are large dispersion between the suitabilities of the contractor candidates, the application due date should be late, so that the possibility increases that the job can be offered to a contractor with an even larger suitability. Even when the number of contractor candidates is very small, for example, a late application due date can be specified or the conditions can be changed as described below so that the remuneration becomes higher.

In step S2104, if no offer is placed, for example, when it is believed that the specified conditions are not appropriate because the number of suitable contractors is too large, or the number of suitable contractors is too small as described above (S2104: No), then the broker 300 is notified of this fact. To be specific, when the "Cancel" button is pressed, a screen for entering new conditions is displayed, on which the conditions for the job offer can be specified again, so that contractors can be retrieved according to these new conditions (S2102).

With the above process, a job offer notification can be transmitted under even more appropriate conditions to even more appropriate professionals only.

Figure 25:
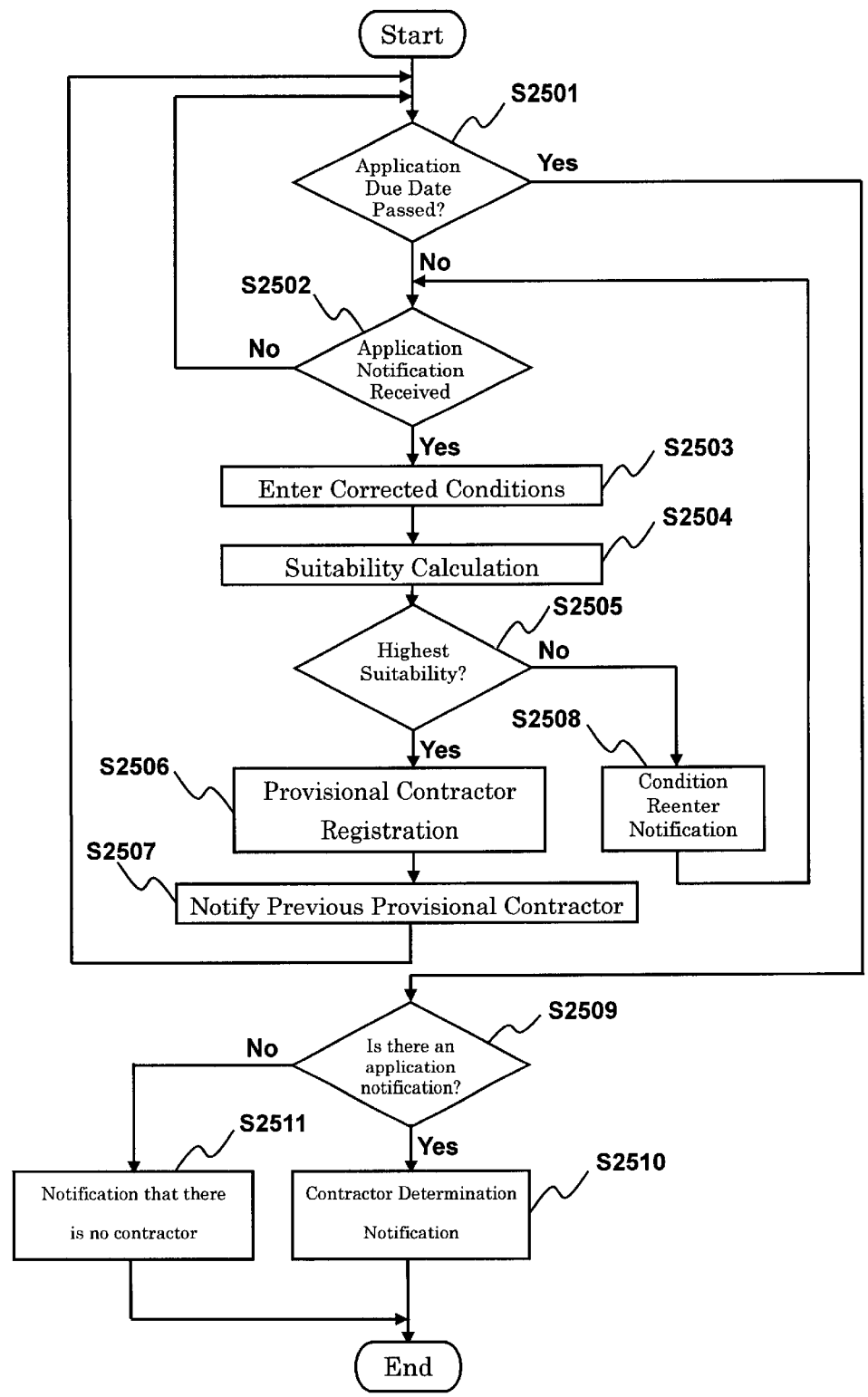
FIG. 25 is a flowchart of the process steps of the broker program in the fourth embodiment.

The following is an explanation of a method for selecting a contractor according to this embodiment. FIG. 25 is a flowchart showing the process steps of the broker program according to this embodiment to select the contractors. As is shown in this figure, when the broker program according to this embodiment has received a job application notification from a contractor before the application due date has passed (S2501: No, S2502: Yes), changes of the contracting conditions regarding the job from the registered conditions in the contractor database shown in FIG. 16 can be entered by the contractor. After all, the data for the contractor information registered in the contractor database are only preliminary values, and it is possible to change these conditions for each application according to the contractor's workload at the time of application and the difficulty of the job (S2503).

Also, when a contractor believes that the job provider's judgement concerning the difficulty stored in the job information database is not appropriate, he can set a new value when applying for the job.

When the contractor has entered these changed conditions, his suitability is calculated according to these conditions (S2504).

When the calculated suitability is the highest (S2505: Yes), or more specifically, when the calculated suitability is higher than the suitability of the provisional contractor registered at this point, the contractor is registered as the provisional contractor (S2506), and this fact is notified to the contractor who has been registered as the provisional contractor until then (S2507).

When the suitability was not the highest (S2505: No), this means that the job cannot be contracted under the current conditions, so that the contractor is advised to enter new conditions if he wishes to obtain the contract (S2508). When the contractor gives up on the contract now, he has to do nothing else, but if he wants to obtain the contract, he can enter new conditions and can submit a new application notification.

On the other hand, with the above-described process, if there was an application notification, a provisional contractor is registered by the broker program side, so if the application due date passes (S2501: Yes), and there has been an application notification (S2509: Yes), the registered provisional contractor and the job provider are notified of the fact that a contractor has been formally decided (S2510), and if there has been no application notification (S2509: No), the job provider is notified of the fact that there is no contractor (S2511).

According to the process as described above, the contractor can apply for a job while adjusting his conditions to the job, and the job provider can automatically offer the job to the most appropriate contractor.

With the job brokering apparatus according to this embodiment, a job can be brokered without complicated negotiations under the most appropriate and adequate conditions for the job provider and the contractor.

Fifth Embodiment

The following is an explanation of a fifth embodiment of the present invention. According to a method of this embodiment, electronic information necessary for the job is sent automatically to the contractors at each job offer, so that jobs can be brokered with even higher efficiency.

Figure 26:
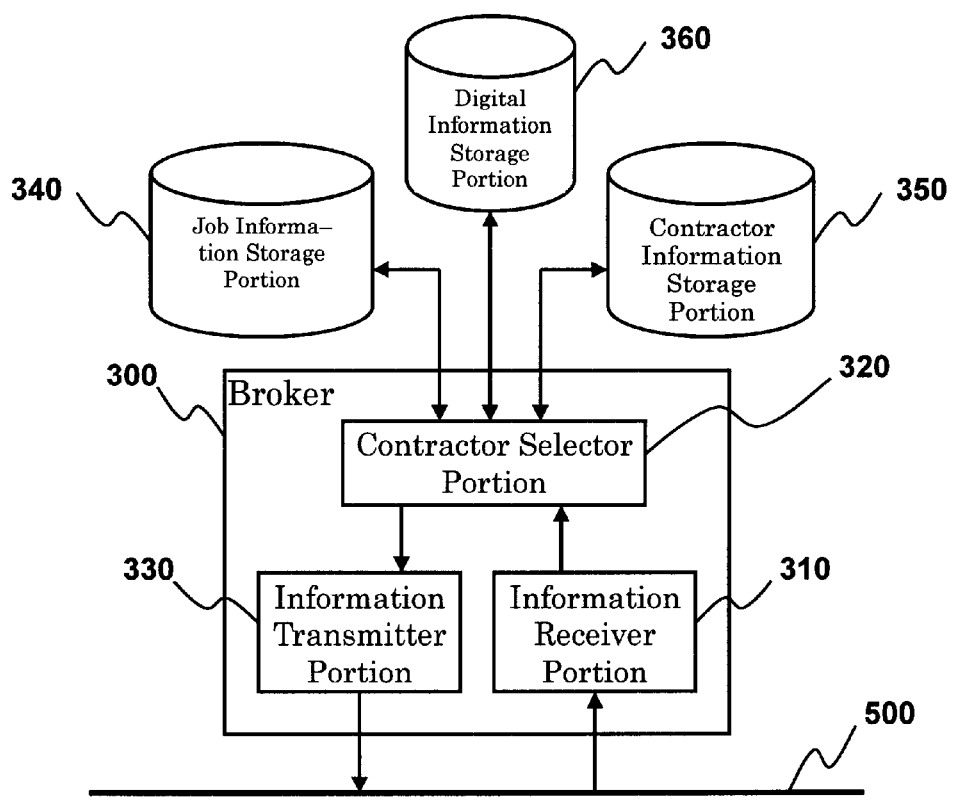
FIG. 26 is a functional block diagram illustrating the structure of the broker in a fifth embodiment.

FIG. 26 is a block diagram illustrating the structure of the broker 300 according to this embodiment. As is shown in FIG. 26, the broker 300 of this embodiment comprises a digital information storage portion 360 in addition to the structure explained above. This digital information storage portion 360 corresponds to the electronic information memory mentioned in the claims.

The digital information storage portion 360 stores, for example in the case of translation, the source document, which the contractor needs once the job brokering is completed, and the translated document, etc. To prevent leakage of the source document or the translated document through unauthorized access to the broker 300, the broker encodes this electronic information with its own secret key before storing it in the digital information storage portion 360. It is preferable to store the secret key in a memory device with higher security. Moreover, the job-provider client 100 and the contractor client 200 of this embodiment have the function to transmit this digital information to the broker 300 when needed and to receive this information from the broker 300 when needed. As a transfer method for this, methods such as file upload and download using a communication protocol such as HTTP are possible.

The process steps for the broker program of this embodiment are basically the same as the steps explained, for example, in FIG. 8. However, for the job offer, the job-provider client 100 transmits the electronic information necessary for the job to the broker 300, and for the selection result notification (S805), the broker 300 transmits this electronic information to the contractor client 200. FIG. 27 shows an example for the screen displayed by the job-provider client 100 in this embodiment. As is shown in this figure, the file-name of the electronic information used for the job is specified when a job is offered in this embodiment. When the "Place offer" button on the lower right side of the screen is pressed, the file is sent to the broker 300, for example by HTTP. If encoding is necessary, the broker 300 uses a secret key stored on a storage device with high security, and stores the encoded file in the digital information storage portion 360. The broker 300 decodes this encoded file with the secret key, and sends it to the contractor client 200 together with the contractor notification for the selected contractor.

Performing the above-described process, for example, eliminates the need to transmit the original text to the contractor by means that are unsuited for large-volume transmission of documents, such as e-mail, after a job contract has been effected. Thus it becomes easier to offer a job.

According to the structure of this embodiment, when a contractor has finished a job, he can transmit electronic information about the finished job to the broker 300. Moreover, it is also possible that the broker 300 notifies the job provider with a notification portion such as e-mail that the job has been finished, and when the job provider obtains this notification and accesses the site of the broker 300, the broker 300 sends this electronic information about the finished job to the job-provider client 100.

When the electronic information about the finished job is stored in the digital information storage portion 360 of the broker 300, it can be encoded with the secret key of the broker 300. It is also possible to utilize public key encryption, such as RSA encryption, by including the job provider's public key in the job information. Thus, a structure is possible where the contractor client 200 can encode the electronic information about the finished job with the job provider's key, so that only the job provider can decode it. Because the contractor client 200 transmits encoded information to the broker 300, the broker 300 does not have to encode the information again. The job provider can decode the electronic information about the finished job with the secret key that corresponds to the public key included in the job information.

With this process, the job provider can receive the results of the job without using means that are unsuited for large-volume data transmission, as sending e-mails from the contractor to the job provider.

For the job provider, this process means that he can receive a finished job just by sending the electronic information necessary to perform he job in advance, when offering the job to the broker 300. That is, when for example the job provider places a job offer when leaving the office after work, the broker 300 can determine a contractor, so that the job can already be finished when the job provider starts work on the next day. Thus, very efficient work can be realized.

Sixth Embodiment

The following is an explanation of a sixth embodiment according to the present invention. This embodiment relates to a method where the job provider can control the job progress of the contractor.

The structure of the broker 300 of this embodiment is the same as the structure of the broker 300 in the fifth embodiment. However, the contractor client 200 of this embodiment comprises the function to transmit an intermediate result of the job as electronic information to the broker 300 when necessary, and the job-provider client 100 comprises the function to receive the electronic information transmitted by the broker 300.

To be specific, the contractor can access the broker site at any time (for example after having translated one chapter) while working on the translation. FIG. 28 shows a schematic drawing of an example of a screen displayed by the contractor client 200 when an intermediate result of the job is uploaded to the broker 300. By specifying a file-name on the screen in FIG. 28, this file can be encoded if necessary, and uploaded to the broker 300. The broker program is then started and uploads the file. At the same time, the job-provider client 100 is notified by a notification portion such as e-mail that an intermediate result has been uploaded. Thus, the job provider can easily verify the progress of the job. A possible method with which the job provider can access the file, is, for example, to provide a link between the download page stating that the intermediate result of the job can be verified and the file.

By providing this function, the job provider can control at any time the process of the job given away to contractors.

Seventh Embodiment

The following is an explanation of a seventh embodiment according to the present invention. This embodiment relates to a method realizing a backup service by re-offering a job to a substitute contractor when the contractor cannot continue a contracted job due to sudden adverse circumstances such as illness or an accident. Also the backup service of this embodiment is realized by a process of the broker program.

FIG. 29 shows a schematic drawing of an example of a screen displayed by the contractor client 200 when the backup service of this embodiment is used. As is illustrated in FIG. 29, when the backup service is used, the file-name of the electronic information necessary to re-offer the job and a percentage corresponding to the job progress are entered from the contractor client.

The broker program of this embodiment sets the new conditions for re-offering a job from the job offering conditions stored in the job information database. This means, the electronic information necessary for a job has to be included in the job information database of this embodiment, for example in the job information shown in FIG. 4

As a method to set new conditions for re-offering a job, the due date can be basically set to the same day as before, but especially from the viewpoint of remuneration, it is possible to adjust several conditions for the contract with the contractor. For example, when, judging by the entered progress percentage, most of the job is already completed, then the job may be re-offered for the rest of the remuneration leaving the corresponding share of the remuneration for the first contractor who could not continue the job. When on the other hand almost nothing of the job got done although the due date is approaching, then it is possible to offer a higher remuneration than for the first contractor.

After this, the job is offered again to the contractors under the new conditions. The process steps for this are the same as in the first embodiment. When a substitute contractor has been determined, a contractor determination notification is sent to the contractor who is registered for the re-offered job.

With the above-described method, a job can be re-offered to a substitute contractor without negotiation when the contractor cannot continue a contracted job due to sudden adverse circumstances such as illness or an accident.

Eighth Embodiment

The following is an explanation of an eighth embodiment according to the present invention. This embodiment relates to a method for dividing a job and offering it to a plurality of contractors.

When, for example in the case of translation, a voluminous document has to be translated in a short period of time, it is sometimes impossible for a single contractor to complete the entire work, from chapter 1 to chapter 10, until the due date by himself. It is convenient, if in that case the job can be divided into a number of chapters and offered to a plurality of contractors. In this case, the job brokering apparatus of this embodiment can divide a job and offer it to a plurality of contractors.

In this embodiment, when offering a job, the conditions can be set, for example, for each chapter of the document. FIG. 30 shows a schematic drawing of an example of a screen displayed by the job-provider client 100 in this embodiment. As is illustrated in FIG. 30, in this embodiment, a divisional-job-offer application form is displayed by the sub-provider 100. The job offering conditions can be adjusted for each divided portion by entering for example the chapter number in the field "Division" in FIG. 30.

Before displaying the contract application form, the broker 300 displays a screen where the contract conditions can be set for each chapter. FIG. 31 shows a schematic drawing of an example of a screen displayed by the contractor client 200 in this embodiment for displaying the contracting conditions of a divided job. A job application form for displaying the conditions for each chapter as shown in FIG. 6 can be displayed by pressing the button "Contract Open" on a screen as illustrated in FIG. 31.

All further process steps are the same as explained for the first embodiment, so that a detailed explanation has been omitted.

As has been explained above, the job brokering apparatus according to this embodiment can process jobs brokering also in the case where, for example, the job provider wants to divide a voluminous job before offering it.

Figure 32:
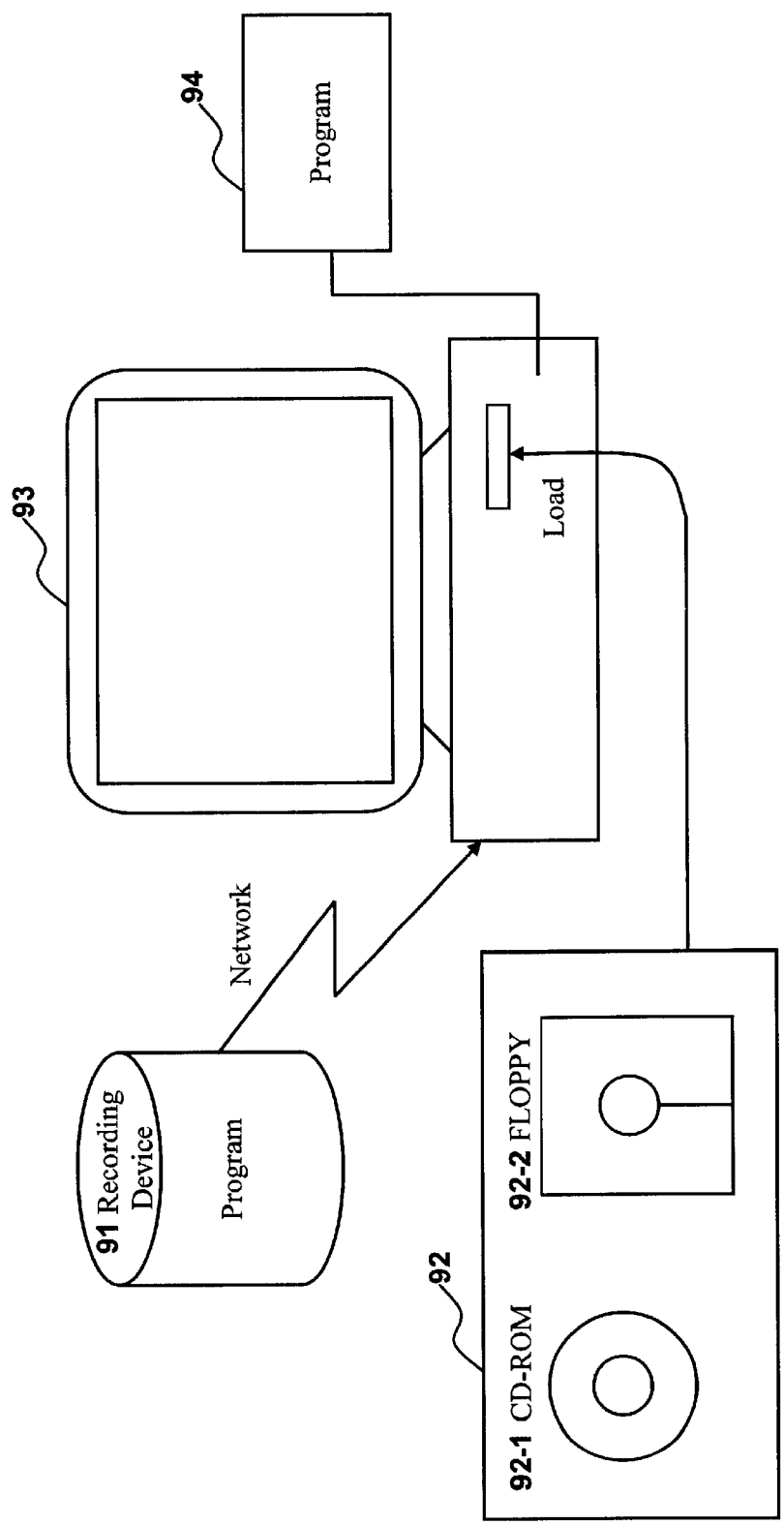
FIG. 32 is a drawing of examples for recording media.

A recording medium for storing a program for realizing a job brokering apparatus according to the present invention can be not only a portable recording medium, such as a CD-ROM or a floppy disk, as illustrated in an example of a recording medium in FIG. 32, but also a recording device provided at the end of a communication line, a computer hard-disk or a RAM-storage. When the program is executed, it is loaded and executed in the main memory.

In the above-explained manner, the job brokering apparatus according to the present invention can process jobs brokering without complicated negotiations in an open network environment such as the internet, between an unspecified job provider and an unspecified contractor.

The invention may be embodied in other specific forms without departing from the spirit or essential characteristics thereof. The embodiments disclosed in this application are to be considered in all respects as illustrative and not restrictive, the scope of the invention being indicated by the appended claims rather than by the foregoing description, all changes that come within the meaning and range of equivalency of the claims are intended to be embraced therein.

What is claimed is:

1. A job brokering apparatus for brokering a job over a network by receiving a job offer request from a job-provider client used by a job provider, receiving job applications for the job offer from contractor clients used by contractors, the job brokering apparatus comprising:

a contractor information storage portion storing information concerning ability to process a job of each contractor;

a contractor candidates determination portion determining contractor candidates who can become contractors for the job offer based on the information concerning the ability to process a job of each contractor stored in the contractor information storage portion when receiving a job offer request from the job-provider client;

a suitability calculator calculating a suitability of the contractor candidates based upon the stored ability information;

a job offer notification portion notifying the job offer to each contractor client used by each contractor candidate;

a job application receiving portion receiving job applications from the contractor candidates including ability information used to recalculate the suitability of the contractor candidates;

a provisional contractor determination portion determining a provisional job contractor who contracts the job from among the contractor candidates who applied for the job according to the suitability of the contractor candidates as recalculated based on the job offer and the received job applications;

a condition reenter notification portion notifying each contractor candidate to enter new ability information when the recalculated suitability of the contractor candidate is not the highest;

a contractor determination portion determining a job contractor who contracts the job from among the provisional job contractor and the contractor candidates who enter the new ability information by re-calculating the suitability of the contractor candidates based on the job offer and the new ability information to determine highest suitability; and a contractor determination notification portion notifying the job-provider client and those contractor clients that were notified of the job offer by the job offer notification portion, of the job contractor determined by said contractor determination portion.

2. The job brokering apparatus according to claim 1, wherein said contractor candidate determination portion determines the contractor candidates based on information about the conditions of the job offer and information about the contractors, and said job brokering apparatus further comprises:

a contractor candidate notification portion notifying the job-provider client of said contractor candidates; and a job offer judgement receiving portion receiving a judgement from the job-provider client whether to notify the job offer to the contractor candidates provided to the job-provider client by said contractor candidate notification portion, wherein said job offer notification portion notifies the job offer to the contractor clients used by said contractor candidates when said job offer judgement receiving portion receives a notification from the job-provider client that the contractor candidates be notified of the job offer.

3. The job brokering apparatus according to claim 2, wherein said contractor candidate notification portion notifies the job-provider client of the suitability of each contractor candidate, wherein the job-provider decides whether to adjust the conditions of the job offer based upon the received suitability information.

4. The job brokering apparatus according to claim 2, wherein, when said job offer judgement receiving portion has received a notification of the fact that the contractor candidates not be notified of the Job offer, said job offer judgement receiving portion further receives information about the conditions of the job that is sent again from the job-provider client, said contractor candidates determination portion again determines one or more contractor candidates on the basis of information about the job received by said job offer judgement receiving portion, and said contractor candidate notification portion notifies the job-provider client of the contractor candidate determined by said contractor candidates determination portion.

5. The job brokering apparatus according to claim 1, wherein the information received by the contractor information storage portion includes schedule information of each contractor.

6. The job brokering apparatus according to claim 1, wherein said contractor determination portion determines the contractor by utilizing the information about the contractor's ability to process a job and determines and updates said information about the contractor's ability to process a job based on the information notified by the job-provider client when the contractor has finished the offered job.

7. The job brokering apparatus according to claim 1, further comprising a job evaluation receiving portion receiving from the job-provider client an evaluation of the job that the contractor has finished, wherein said information about the contractor's ability to process a job is determined on the basis of the evaluation that said job evaluation receiving portion has received.

8. The job brokering apparatus according to claim 1, the job brokering apparatus further comprising:
- a job offer receiving portion receiving the job offer and unprocessed job offer data to be processed by the job contractor who is the contractor candidate to be awarded the job offer through the contractor determination portion;
- a job offer data encoding portion encoding the unprocessed job offer data received via the job offer receiving portion; and
- a job offer data transmitting portion transmitting the encoded unprocessed job offer data and the decoding key to the job contractor.

9. The job brokering apparatus according to claim 1, the job brokering apparatus further comprising:
- a job offer receiving portion receiving the job offer and unprocessed job offer data to be processed by the job contractor who is the contractor candidate to be awarded the job offer through the contractor determination portion;
- a job offer data transmitting portion transmitting both the unprocessed job offer data and a public key of the job-provider used in a public key cryptograph system to the job contractor; and
- a processed job data transmitting portion receiving the processed job data processed by the job contractor, wherein the processed job data is encoded by the public key of the job-provider and transmitting the receiving processed job data to the job-provider client.

10. The job brokering apparatus according to claim 1, the job brokering apparatus further comprising:
- a job offer receiving portion receiving the job offer and unprocessed job offer data to be processed by the job contractor who is the contractor candidate to be awarded the job offer through the contractor determination portion;
- a job offer data transmitting portion transmitting the unprocessed job offer data to the job contractor;
- a processed job data part receiving portion receiving data from the job contractor concerning part of the unprocessed job data which already have been processed; and
- a job progress status notification portion detecting which part of the job the job contractor has processed based on the received data in the processed job data part receiving portion and notifying the job progress status of the job contractor to the job provider client.

11. The job brokering apparatus according to claim 10, further comprising:
- an alternative job contractor re-determining portion for re-determining a new job contractor as an alternative job contractor to take over the unprocessed part of the job indicated by the job progress status notification portion when the job contractor cannot continue performing the job due to sudden adverse circumstances.

12. The job brokering apparatus according to claim 1, wherein the contractor determination portion comprises an alternative job contractor re-determining portion re-determining a new job contractor as an alternative job contractor according to a handing over condition and notifying the handing over condition to the alternative job contractor by the contractor determination notification portion when the current job contractor cannot continue a contracted job due to sudden adverse circumstances.

13. The job brokering apparatus according to claim 1, the job brokering apparatus further comprising:
- a job offer receiving portion receiving the job offer and unprocessed job offer data to be processed by job contractors determined by the contractor determination portion;
- a job offer dividing portion dividing the job offer received by the job offer receiving portion into unprocessed job offers responsive to input by the job-provider client concerning dividing the job offer; and
- a job offer transmitting portion transmitting each divided unprocessed job offer data to be processed to the job contractors, wherein the job offer notification portion notifies the divided job offer divided by the job offer dividing portion and the contractor determination portion determines the job contractors who contract the divided job from among the contractor candidates who applied for each divided job when a job application has been received corresponding to the notification from said job offer notification portion.

14. The job brokering apparatus according to claim 13 further comprising:
- a job contracting condition information compositing portion receiving job contracting condition information for each divided job from each job contractor and compositing the job contracting condition information into a displayable form representing job contracting condition information of the job offer as a whole before the dividing; and
- a job contracting condition information transmitting portion transmitting the composited job contracting condition information to the contractors.

15. A computer-readable recording medium for controlling a computer and storing a program for realizing a job brokering apparatus which brokers a job over a network by receiving a job offer request from a job-provider client used by a job provider, and receiving job applications for the job offer from contractor clients used by contractors, the program comprising:
- a contractor information storing operation, where information concerning ability to process a job of each contractor is stored;
- a job offer request receiving operation, where a job offer request is received from the job-provider client;
- a contractor candidates determining operation, where contractor candidates who can become contractors for the job offer are determined based on the information of the ability to process a job of each contractor stored in the contractor information storing operation;
- a suitability calculating operation, where a suitability of the contractor candidates is calculated based upon the stored ability information;
- a job offer notification operation, where the job offer is notified to each contractor client used by each contractor candidate;

a job application receiving operation, where job applications from the contractor candidates including ability information to recalculate the suitability of the contractor candidates is received;

a provisional contractor determination operation, where a provisional job contractor who contracts the job is determined, from among the contractor candidates who applied for the job according to the suitability of the contractor candidates as recalculated based on the job offer and the received job applications;

a condition reenter notification operation notifying each contractor candidate to enter new ability information when the recalculated suitability of the contractor candidate is not the highest;

a contractor determination operation determining a job contractor who contracts the job from among the provisional job contractor and the contractor candidates who enter the new ability information by re-calculating the suitability of the contractor candidates based on the job offer and the new ability information to determine a highest suitability; and a contractor determination notification operation, notifying the job-provider client and those contractor clients who were notified of the job offer by the job offer notification operation, of the job contractor when the job contractor has been determined in said contractor determination operation.

16. A system brokering jobs comprising:

a network to transfer to contractors a job offer having conditions from a job-provider and to transfer from the contractors applications Including contractor information and renewed contractor information for the job offered from the job-provider; and a contractor determination unit calculating a suitability of the contractors based upon the conditions from the job provider and stored contractor information, provisionally awarding the job offered from the job provider to one of the contractors who applied for the job offered from the job-provider according to the suitability Information as recalculated based on the conditions of the offered job and the contractor information received in the applications, and awarding the job offered from the job-provider to one of the contractors who applied for the job offered from the job-provider according to the suitability information as further recalculated based on the conditions of the offered job and the renewed contractor information received in the applications.

17. A computer system to broker a job in a client-server network by receiving a job offer request from a job-provider client used by a job provider and receiving job applications for the job offer from contractor clients used by contractor candidates, the computer system comprising:

a storage unit; and a processor programmed to store in the storage unit job ability information of the contractor candidates, to calculate a preliminary suitability of the contractor candidates based on the stored job ability information, to notify the contractor candidates of the job offer request based on the preliminary suitability, to receive the job applications including job ability information for the job offer request from the notified contractor candidates, to calculate a suitability of each notified contractor candidate based upon the job offer request and the job applications received from each notified contractor candidate, to notify each notified contractor candidate to renew the job ability information, to recalculate a suitability based upon the renewed job ability information received from each notified contractor candidate, to award the job offer request to one of the notified contractor candidates as a contractor based upon the recalculated suitability, and to notify the award to the contractor and the notified contractor candidates.

* * * * *